US012810412B2

(12) United States Patent
Doedens et al.

(10) Patent No.: US 12,810,412 B2
(45) Date of Patent: Nov. 24, 2026

(54) METHOD FOR MANUFACTURING AND INSPECTING A FACTORY JOINT DURING INSTALLATION

(71) Applicant: NEXANS, Courbevoie (FR)

(72) Inventors: Espen Doedens, Halden (NO); Sebastian Kjonigsen, Fredrikstad (NO)

(73) Assignee: NEXANS, Courbevoie (FR)

( * ) Notice: Subject to any disclaimer, the term of this patent is extended or adjusted under 35 U.S.C. 154(b) by 111 days.

(21) Appl. No.: 18/977,952

(22) Filed: Dec. 12, 2024

(65) Prior Publication Data

US 2025/0217961 A1 Jul. 3, 2025

(30) Foreign Application Priority Data

Dec. 27, 2023 (NO) .................................... 20231396

(51) Int. Cl.
*G06T 7/00* (2017.01)
*G01B 11/30* (2006.01)
(Continued)

(52) U.S. Cl.
CPC .......... *G06T 7/0006* (2013.01); *G01B 11/303* (2013.01); *G06T 7/40* (2013.01);
(Continued)

(58) Field of Classification Search
CPC .......... G06T 7/0006; G06T 7/40; G06T 7/60; G06T 7/75; G06T 17/00; G06T 2200/04; G06T 2207/30148; G06T 7/0004; G06T 7/62; G06T 2207/10028; G06T 2207/30204; G01B 11/303;
(Continued)

(56) References Cited

U.S. PATENT DOCUMENTS 7,573,586 B1 8/2009 Boyer et al.
2025/0389674 A1* 12/2025 Gustafsson ............ G01B 11/24

FOREIGN PATENT DOCUMENTS

EP 3369075 9/2018
EP 3547474 10/2019
(Continued)

OTHER PUBLICATIONS

Extended European Patent Search Report for corresponding application 24306994.5; Report dated 06.12.2025, 9 pages.

*Primary Examiner* — Haixia Du
(74) *Attorney, Agent, or Firm* — CANTOR COLBURN LLP

(57) ABSTRACT

A method (46) for manufacturing and inspecting a factory joint during installation includes preparing (48) an initial layer of the factory joint, capturing (50) and storing (52) 3D data of an outer surface of the initial layer by using a 3D surface scanner, and preparing (48) a subsequent layer. 3D data of an outer surface of the subsequent layer is captured and stored. The 3D data is merged by transformation into a common reference system, and the resulting merged 3D model is analyzed to determine shape parameters and/or surface texture parameters. The determined parameters are compared with expected parameters, and if the determined parameters deviate by more than a predetermined tolerance from the expected parameters, a deviation signal is output. The third through eight steps may be repeated until the factory joint is completed.

13 Claims, 2 Drawing Sheets

(51) Int. Cl.
*G06T 7/40* (2017.01)
*G06T 7/60* (2017.01)
*G06T 7/73* (2017.01)
*G06T 17/00* (2006.01)
*H02G 1/14* (2006.01)

(52) U.S. Cl.
CPC .................. *G06T 7/60* (2013.01); *G06T 7/75* (2017.01); *G06T 17/00* (2013.01); *G06T 2200/04* (2013.01); *G06T 2207/30148* (2013.01); *H02G 1/14* (2013.01)

(58) Field of Classification Search
CPC ........... G01B 2210/52; G01B 11/2518; G01B 11/24; G01B 11/02; G01B 11/06; G01B 2210/54; H02G 1/14; G01N 21/952
See application file for complete search history.

(56) References Cited

FOREIGN PATENT DOCUMENTS

| | | | |
|---|---|---|---|
| EP | 3775770 | | 2/2021 |
| EP | 3901571 | A1 | 10/2021 |
| EP | 4269939 | | 11/2023 |
| EP | 4270310 | | 11/2023 |
| EP | 4270694 | | 11/2023 |

* cited by examiner

METHOD FOR MANUFACTURING AND INSPECTING A FACTORY JOINT DURING INSTALLATION

RELATED APPLICATION

This application claims the benefit of priority from Norwegian Patent Application No. 2023 1396, filed on Dec. 27, 2023, the entirety of which is incorporated by reference.

FIELD OF THE INVENTION

The present invention relates to a method and a system for inspecting a factory joint during installation.

BACKGROUND

High voltage (HV) cables for the transmission of electrical power usually comprise a conductor as a core element, which is surrounded by an inner semiconducting layer. The conductor may be stranded and thus may comprise a corrugated or wavy peripheral surface. The semiconducting layer assists in providing a harmonic and even electrical field around the conductor. Local air pockets between the conductor and the insulating layer can be prevented and local electric discharges are avoided. The inner semiconducting layer is surrounded by an insulating layer, which usually comprises a polymer material. It is usually surrounded by an outer semiconducting layer, which is often covered by a metallic screen and a polymer outer sheath.

The outer layers that surround the insulating layer are removed from an end of the HV cable by cutting, peeling, sanding or other processes, to prepare the cable end for accessory installations, such as cable joints and terminations. Before placing the desired cable accessory onto the HV cable end, the surface quality of the insulating layer is inspected to make sure there are no surface irregularities. As the surface of the insulating in the transition to the cable accessory is subjected to tangential and radial electrical fields, this is crucial for avoiding local electric discharges and preventing a failure due to a dielectric breakdown.

Flexible factory joints are crucial for HVAC and HVDC submarine applications as they allow for splicing of manufacturing lengths into delivery lengths. These joints are manually constructed by restoring each layer of the cable step-by-step. Typical steps involved in this process include welding conductors, and vulcanizing, shaping, or fusing the inner semiconducting material, insulation, and outer semiconducting material. Finally, additional layers are added over the joint.

The manufacture of factory joints is a labor-intensive process that involves manual labor and inspection of every added layer, due to the diversity of required geometric designs. Highly skilled and trained professionals are thus essential for factory jointing, as they must be capable of following complex procedures and detecting any deviations from design requirements throughout the entire joint-making process. A quality control may include a control of only certain attributes by manual measurements of dimensions with rulers, calipers, and ultrasonic equipment at strategically selected positions. An electrical quality control may only be performed after the insulation layer is completed, which results in a prolonged feedback loop between manufacturing and the quality control.

An object of the invention is to propose an alternative method for inspecting a factory joint during installation.

SUMMARY OF THE INVENTION

The present invention is defined by the appended claims and in the following:

In a first aspect, the invention relates to a method for manufacturing and inspecting a factory joint during installation, the method comprising the steps of:

a) preparing an initial layer of the factory joint, b) capturing and storing an initial set of 3-dimensional (3D) surface geometry measurement data of an outer surface of the initial layer by moving a 3D surface scanner about the initial layer, c) preparing a subsequent layer of the factory joint, d) capturing and storing a subsequent set of 3-dimensional (3D) surface geometry measurement data of an outer surface of the subsequent layer by moving a 3D surface scanner about the subsequent layer, e) merging the 3D surface geometry measurement data of the subsequent layer with previous 3D surface geometry measurement data by transforming the captured 3D surface geometry measurement data of the layers into a common reference coordinate system to form a merged 3D model of the layers, f) analyzing the merged 3D model to determine shape parameters and surface texture parameters of the subsequent layer, g) comparing the determined shape parameters with expected shape parameters, and/or comparing the determined surface texture parameters with expected surface texture parameters, and if the determined shape parameters deviate by more than a predetermined shape tolerance from the expected shape parameters and/or if the determined surface texture parameters deviate by more than a predetermined surface texture tolerance from the expected surface texture parameters outputting a deviation signal, and h) repeating steps c) to g) until the factory joint is completed.

Factory joints are usually hand-made joints involving several manual surface preparation steps. These may include welding and finishing the surface of a conductor weld; molding an inner semiconductor, afterwards ensuring its surface finish and thickness; fine coning and improving the surfaces on two insulation cones on each side of the factory joint, and semiconductor stops beyond them; common insulation molding, improving and inspecting the thickness and outer surface of the finalized common insulation; as well as providing metal and outer screen reconstitution, inspecting the finish and geometry of the completed layers. All these steps, and in particular the steps related to the semiconductors and the insulation, demand a reliable and thorough quality control. The method according to the invention is capable of providing such a reliable and thorough quality control and is also capable of documenting the complete installation process through a layer-by-layer inspection in a traceable manner.

The term "preparing" is to be understood as creating and/or forming and/or finishing a certain part of the factory joint. When a layer is "prepared" it is completed and can be inspected accordingly. Preparing the initial layer of the factory joint may include welding two conductor ends and finishing the weld at a core of the cross section of the factory joint. Preparing the initial layer may, however, also refer to creating or applying an inner metallic screen or a semiconducting layer.

After preparing the initial layer, a 3D surface scanner is moved about the initial layer to capture 3D surface geometry data that represent the structure of the outer surface. Preferably, the complete surface of the initial layer is scanned by the 3D scanner.

A 3D surface scanner may be understood as a device that is configured to capture the shape of a three-dimensional object. This may be done by measuring the distances between the 3D surface scanner and various points on the object's surface when moving the 3D surface scanner about the object. The 3D surface scanner may use sensors and a light source, such as a laser, to project a pattern onto the object and record the reflected or displaced light. The 3D scanner may then calculate the 3D coordinates of each point using triangulation or other methods, and may form a point cloud of the scanned object. The point cloud may be converted into a polygon mesh, which is a collection of vertices and faces that represent the object's surface. A 3D surface scanner may also capture the color and appearance of the object by using cameras or other sensors. By scanning a prepared layer of the factory joint with such a 3D surface scanner, the texture of the layer's outer surface, as well as the volume enclosed by the layer can be determined.

The 3D surface geometry measurement data of the initial layer may be stored in a memory of the 3D surface scanner and/or a memory outside the 3D surface scanner, such as in a processing unit in signal connection with the 3D surface scanner. The stored data then represents the shape of the visible outer surface of the initial layer. This initial data set may form a basis for creating a 3D model with the 3D surface geometry measurement data sets of subsequent layers.

When the data set of the initial layer is generated, a subsequent layer of the factory joint is prepared. In most cases, the respective subsequent layer is arranged on the outer surface of at least one previous layer. This may, for example, comprise molding an inner semiconducting layer, molding an insulation layer, and/or reconstituting a metal or outer screen. Cable ends that are to be connected with the factory joint comprise an insulation that may surround an inner semiconducting layer. Preparing the corresponding insulation layer of the factory joint may comprise fine coning of the insulation layers of both cable ends to provide a conical shape with a defined slope, defined delimitations, and a smooth conical surface at each cable end. When preparing this layer, there may be an axial distance between two opposed ends of the insulations of both cable ends. The space between the two opposed ends will be filled with a joint insulation as a further layer.

The outer surface of the subsequent layer is captured by the 3D scanner to create 3D measurement data of the outer surface of the subsequent layer in the same way as with the previous layer.

An advantageous step lies in merging the 3D surface geometry measurement data of the subsequent layer with previously generated 3D surface geometry measurement data. By merging the data of several layers into one common reference coordinate system, the volumes enclosed by two subsequent layers is mapped. The merged 3D model, which is formed by the merged data sets, can particularly be used for assessing the thickness of each layer, with high accuracy in lengthwise and angular orientation of the respective assembly.

Preferably, the 3D surface scanner may be a handheld device. The mean distances between the 3D surface scanner and the respective outer surface of the layer to be scanned may differ from layer to layer and even during the scan of different regions of the respective layers, since the process of scanning may be manual. By transforming the data sets of the layers into a common reference system, an exact representation of the three-dimensional shape of all layers together can be created. This may require one or more reference features, which have known geometric characteristics and known positions, and which may be present in the scanning regions of each layer. Such a reference feature may be a distinctive point, line, or surface that can be recognized in different data sets, such as a corner, an edge, or a plane.

A local coordinate system may be assigned to each data set during the scanning. In the data set of the layer that is in the process of being scanned or that has been scanned already, the reference feature may be identified. The respective data set can be merged with the already existing data set through matching the identified reference feature with the reference feature present in the already existing data set. This may include scaling, rotation and translation of the points in the respective data set. By application of a transformation function to the respective data set, all data points from the local coordinate system can be converted to the common reference coordinate system. This process may be referred to as registration. The merged 3D model may contain data of the outer surfaces of all layers that have been scanned.

The general form, outline or external boundary of a layer may be referred to as its shape. The shape may be defined by one or more suitable parameters, which may be referred to as shape parameters. These may, for example, comprise a dimension, such as a length, a width or a height. These may also include the number of faces, edges, vertices and their spatial course of extension.

On the other hand, the surface texture may refer to the micro-geometry or fine-scale structure of the layer. It may include aspects such as roughness, waviness, and other detailed characteristics that are superimposed onto the shape of the outer surface of the layer. These characteristics may be perceived as tactile sensations, such as a smooth or a rough surface, or visual cues, such as a glossy or matte surface. The surface texture may be defined by various different surface texture parameters, which may include vertical parameters, e.g. amplitude parameters, and/or horizontal parameters, e.g. spacing of vertical features.

The acquired data allow to determine the shape and the surface texture of the outer surface of each layer. Also, due to merging the data sets, thickness information in the form of local distances between two consecutive layers can be calculated as additional shape parameters.

For conducting a quality control, certain tolerances may be defined for the shape parameters that are to be compared with expected shape parameters. A tolerance may be understood as a permissible limit of variation in a physical dimension. A skilled person would apply a suitable tolerance on the respective shape parameter with a suitable value depending on the type of cable and planned voltages. The tolerances may include, without claiming to be complete, straightness, parallelism, perpendicularity, position, flatness, angularity, symmetry, perpendicularity, coaxiality, run-out, roundness, cylindricity, surface roughness, layer thickness etc.

If any of the determined shape parameters deviate by more than the respective predetermined shape tolerance from the expected shape parameters and/or if the determined surface texture parameters deviate by more than a predetermined surface texture tolerance from the expected surface texture, a signal may be generated to inform a user about the deviation that exceeds the respective tolerance. The detected deviation may be a local deviation, i.e. on one or more pieces or sections of the respective layer, or a global deviation. The comparing of the determined and expected parameters may reveal if the detected parameters locally deviate from the expected parameters. The signal may be generated and output during scanning, and/or after storing and/or after merging and/or transferring the data. The deviation signal may be formed as a data flag, and/or as an acoustic, visual of haptic signal.

Outputting the deviation signal may lead to reworking the respective layer(s). For example, if a surface texture parameter deviates from the expected surface texture parameter, the surface of the respective layer may be too rough. A reworking step may thus include sanding or polishing the layer. If, however, the deviation is caused by the thickness of a layer being too small, a reworking step may include removing the layer and preparing the layer again. Depending on the deviation, the reworking may thus include one of a variety of possible steps to create a factory joint that has the desired characteristics. To allow the user to decide which reworking step(s) may be required, the deviation signal may include details of the detected deviation.

The steps of preparing a subsequent layer, scanning the outer surface, merging the data sets, analyzing the merged 3D model and comparing the shape parameters may be repeated until the factory joint is completed. A user may thus inspect each layer and is allowed to rework each inspected layer in case a deviation exceeds the respective tolerance.

By the method according to the invention, the quality of inspection of a factory joint during installation is thus greatly improved and the installation process of the factory joint can simply be documented for future reference.

At least one of the layers may comprise an insulation material. The thickness and the characteristics of the boundary surfaces of an insulation layer, i.e. the outer surface of the layer and an inner surface of the layer, are important to meet a desired insulation behavior. Particularly, as the surfaces of the insulating layer may be subjected to tangential and radial electrical fields, their surface qualities are crucial for avoiding local electric discharges and preventing a failure due to a dielectric breakdown. When inspecting an insulation layer all local thicknesses can be calculated in the form of local distances between the outer surface of the previous layer beneath the insulation layer and the outer surface of the insulation layer itself, if it can be assumed that both layers are flush with each other without any gaps.

At least one of the layers may comprise a semiconducting material. A layer comprising a semiconducting material supports the distribution of electrical stresses within the factory joint. Any defects or irregularities in the semiconducting layer may affect the integrity of the factory joint. Inspecting a semiconductor layer ensures that the interface between different layers is well-defined and free from potential sources of electrical stress concentrations. This may also include the identification of contaminations introduced into or onto the semiconducting layer.

At least one of the layers may have a conical shape. The respective layer may, for example, be an insulation layer. It may comprise a stress cone that helps to prevent localized concentrations of electrical stress. Insulation failure at a termination of a shielded cable caused by a high electrical stress and a high potential gradient between a shield termination and a cable conductor is thus prevented. It is to be understood that other layers attached onto such a stress cone may be conical at least in part. Providing the correct shape, surface structure, edge contours and other characteristics of such a stress cone is important for meeting the desired dielectric characteristics of the factory joint. Using the method according to the invention reliably allows to inspect conical shapes of layers of the factory joint in situ and also after completion of the factory joint.

Capturing of the initial layer and of the subsequent layer(s) may comprise capturing at least one reference feature separate from the layers when capturing the 3D surface geometry measurement data of the layers, such that the captured 3D surface geometry measurement data of the layers comprise the reference feature, and the transforming of step c) may comprise matching the shape and orientation of the reference feature in the layers. The reference feature, which could be a distinctive point, line, or surface that can be recognized in different data sets, such as a corner, an edge, or a plane, could be used as a pattern that can be identified within a plurality of data sets, in order to conduct the transformation. For example, the reference feature may belong to a frame, a holder or a table that is used for supporting the cable ends and the factory joint when the factory joint is installed. It is conceivable to use a plurality of reference features, such as a plurality of dots or markings on the respective frame, holder or table or directly on the cable ends. When scanning the respective layer, the reference feature can be seen when moving the 3D scanner over the region to be scanned. The term "separate" means that the reference feature is not part of the layer structure of the factory joint, but is separate from it and, in particular, is arranged at a distance from it. However, the reference feature may be arranged so close to the layer structure that it is easily detected during scanning. The term "matching" describes identifying and pairing corresponding points or features in two three-dimensional data sets, which may represent images, based on their spatial characteristics. The reference feature serves as a key point of alignment, and a matching algorithm seeks to minimize the disparity between the coordinates of the same reference feature that is present in both data sets. The result is a transformation that brings one data set into registration with the other, ensuring a spatial correspondence between the two data sets in the common reference coordinate system. The matching process may involve techniques such as point-to-point registration, feature-based matching, or other. The orientation, i.e. the spatial configuration defined by its rotational alignment with respect to the common reference coordinate system, specifying the angular positioning of the reference feature in three-dimensional space, as well as its location and its size in the reference coordinate system are the same for both data sets.

As an alternative or in addition thereto, the transforming may comprise identifying geometrical divergences of a surface area of two subsequent layers and matching the orientation of the surface area in the layers based on the divergences. It may thus be possible to provide a coordinate transformation without any dedicated reference features that are separate from the layers. Instead, characteristic parts of other layers may be identified in the data sets of two consecutive layers to determine a transformation matrix for merging. These divergences may be, for example, boundary edges or the like. It is referred to the explanation of the term "matching" above.

The step f) explained above may comprise determining layer thicknesses as shape parameters of the respective layer from the merged 3D model, wherein step g) may comprise comparing the determined layer thicknesses with expected layer thicknesses. As explained above, this may refer to local or global deviations. The comparing of the determined and expected layer thicknesses may reveal if the detected layer thicknesses locally deviate from the expected layer thicknesses. A determination of a local layer thickness may comprise calculating a local distance, i.e. at a chosen point, between an inner surface and an outer surface of the respective layer. The local distance may be understood as a smallest distance between the chosen point on the outer surface and a corresponding point on the inner surface. This can be done using a number of different algorithms. For example, it may involve creating a sphere with its center at a point on the outer surface and with the smallest possible radius that results in the sphere touching the inner surface at essentially a single point. However, many other algorithms may be used, the choice of which may depend on the size, shape and type of the factory joint. When assuming that neither contaminations nor air pockets are enclosed by two subsequent layers, the local distance may be calculated as the smallest distance between the outer surface of the layer that is inspected and the outer surface of the previous layer directly beneath the layer that is inspected. Local layer thicknesses at a plurality of points on the outer surface may be determined to determine a thickness distribution in the entire respective layer.

Above-mentioned step f) may comprise determining the orientation and spatial course of boundary edges as shape parameters of the respective layer from the merged 3D model, and step g) may comprise comparing the determined orientation and spatial course of boundary edges with expected orientation and spatial course. This may be particularly useful for inspecting accurate contours, courses and shapes of boundary edges, such as those of a conical surface. Besides that, also the orientation and spatial course of curved surfaces extending between discrete boundary edges, e.g. the sloped conical surface itself, may be analyzed.

Step e) as explained above may comprise merging the 3D surface geometry measurement data of all layers to form a merged 3D model of the factory joint. Accordingly, the production or installation of all individual layers of the factory joint can be monitored to create a holistic, three-dimensional model of the factory joint, so that subsequent assessments can be carried out if necessary.

Step f) may comprise determining a slope of the conical shape as one of said shape parameters, and step g) may comprise comparing the slope of the conical shape with an expected slope of the conical shape. Resultantly, the quality of the fine-coning process can be inspected.

Step f) may comprise an identification of textural defects. Textural defects on an outer surface of a layer, for example on the slope of a conical surface, may be identified by filtering or eliminating macro-data, such that only minute textural variations remain. On the remaining textural data assessments may be conducted based on slope, gradient or textural indents. Besides that, finite element method calculations on small domains may be done, i.e. localized finite element method (FEM) computations may be used to detect regions that could lead to undesired electric effect. FEM may effectively screen regions prone to high levels of field enhancement or cavity formation and may determine, whether a textural structure is acceptable or not.

The method may comprise the steps of:

i) capturing and storing a set of volumetric 3D image data of at least one layer by using a volumetric 3D imaging device, and j) combining the volumetric 3D image data with the 3D surface geometry measurement data of the at least one layer to form an enhanced 3D model.

The 3D imaging device may be understood as a device that is configured to capture volumetric image information of a layer, i.e. which is configured to retrieve image information from within the respective layer in a region between its boundary surfaces. It is conceivable to use imaging devices that are based on ultrasound, X-ray or other.

This enhances the 3D model by additional data, which would otherwise not be available to the user. It may be possible to detect contaminations, air pockets or the like between two consecutive layers. Combining the data may involve a multimodal fusion, which may require a registration of the 3D volumetric image data with the 3D surface geometry measurement data.

In a second aspect, the invention relates to a system for inspecting a factory joint during installation, the system comprising a 3D surface scanner, and a processing unit couplable with the 3D surface scanner, wherein the processing unit is configured to receive 3D surface geometry measurement data from the 3D surface scanner, and wherein the processing unit is configured to inspect 3D surface geometry measurement data captured by the 3D surface geometry measurement device to determine shape parameters and/or surface texture parameters of the layer, and to compare the determined shape parameters with expected shape parameters, and/or to compare the determined surface texture parameters with expected surface texture parameters, and to output a deviation signal if the determined shape parameters deviate by more than a predetermined shape tolerance from the expected shape parameters and/or if the determined surface texture parameters deviate by more than a predetermined surface texture tolerance from the expected surface texture parameters. The 3D surface scanner may provide the data to a separate processing unit, or the processing unit may be integrated into the 3D surface scanner. The system is capable of conducting the method explained above.

SHORT DESCRIPTION OF THE DRAWINGS

In the following description this invention will be further explained by way of exemplary embodiments shown in the drawings.

DETAILED DESCRIPTION OF THE INVENTION

Figure 1:
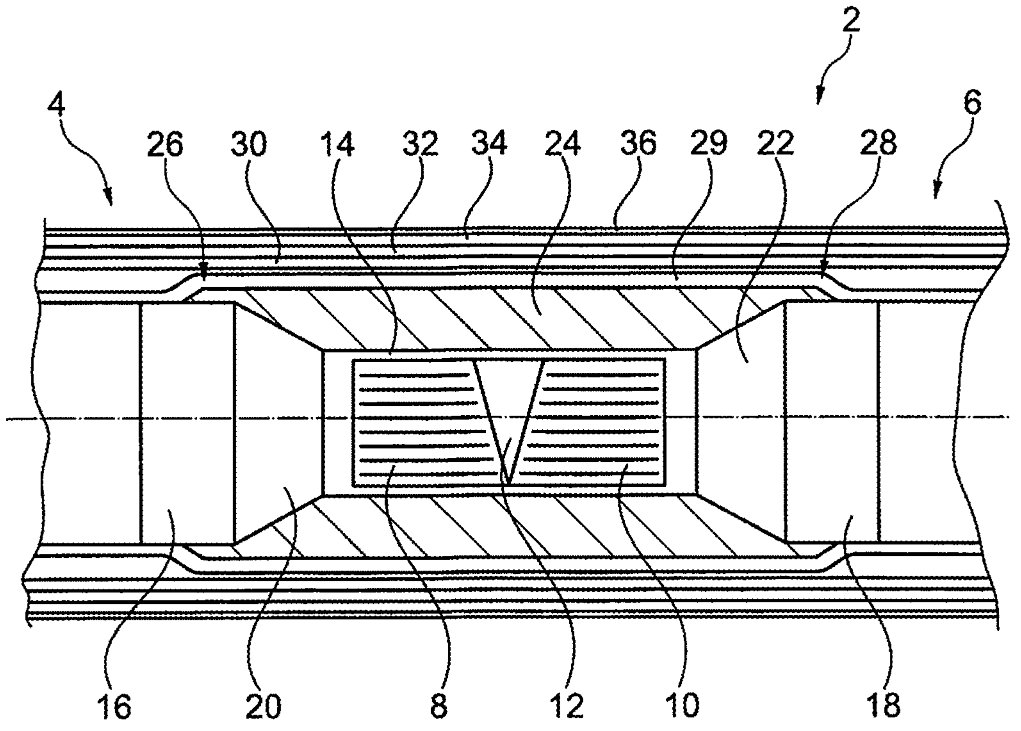
FIG. 1 shows a cross-sectional view of a factory joint connecting two cable ends.

FIG. 1 shows a typical setup of a factory joint 2 for connecting a first cable end 4 and a second cable end 6. It is to be understood that the two cable ends 4 may belong to high voltage cables, such as HVAC or HVDC cables. When starting to install the factory joint 2, conductors 8 and 10 axially protrude from the cable ends 4 and 6, i.e. a first conductor 8 from the first cable end 4 and a second conductor 10 from the second cable end 6.

In the center of the illustration, the first conductor 8 and the second conductor 10 are welded to form a weld 12. The welding process may be chosen depending on the material of the conductors 8 and 10, which may, for example, comprise copper or aluminium.

The conductors 8 and 10 and the weld 12 are surrounded by a semiconductor layer 14, which may be based on carbon black dispersed within a polymeric matrix. This semiconductor layer 14 may be referred to as inner semiconducting layer 14, as it may be the innermost semiconducting layer of the completed factory joint 2. The inner semiconducting layer may be installed by molding, wherein the outer surface of the inner semiconducting layer 14 may be finished afterwards.

The cable ends 4 and 6 each comprise an insulation 16 and 18, which are formed to cones 20 and 22 to mitigate electric stress within the factory joint 2. The shape of the cones 20 and 22 may be prepared prior to welding the conductors 8 and 10 or afterwards, depending on available tools. The cones 20 and 22 in fact have a frustoconical shape with annular end faces, which may preferably be parallel to each other. It is detrimental to prepare the cones 20 and 22 with exact delimitations, i.e. precisely finished annular end faces and an exact shape and course of the lateral surface that extends between the annular end faces.

The inner semiconducting layer 14 and both cones 20 and 22 are surrounded by a joint insulation 24. The joint insulation 24 may be molded onto the arrangement of insulations 16 and 18, cones 20 and 22 as well as the inner semiconducting layer 14.

The joint insulation 24 axially extends beyond the respective cones 20 and 22 in a direction away from the weld 12. The joint insulation 24 is chamfered at axial ends 26 and 28 to form frustoconical end shapes that taper off in a direction away from the weld 12.

The insulations 16, 18 and 24 are surrounded by an outer semiconducting layer 29, which may have similar properties as the inner semiconducting screen 14. Thus, preparing the outer semiconducting layer 29 may comprise a molding process.

The outer semiconducting layer 29 is exemplarily enclosed by a lead sheath 30, a PE sheath 32, a metallic screen 34 and an outer PVC protection sheath 36. It is to be understood that other setups of the factory joint 2 may be possible and are not ruled out herein.

The individual layers, i.e. from the weld to the outer PVC protection sheath 36 may be manually be prepared one after another. Each layer may be inspected by using the method explained further below with reference to FIG. 3.

Figure 2:
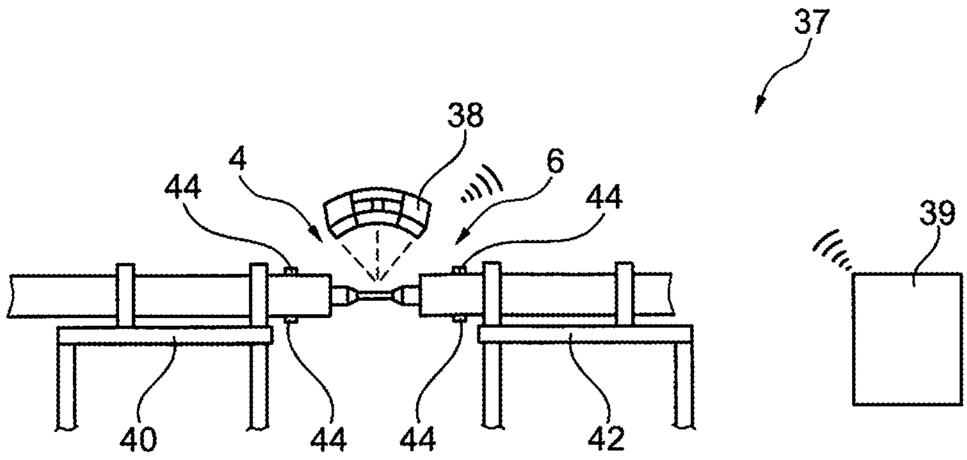
FIG. 2 shows a schematic overview of a system for inspecting a factory joint.

FIG. 2 shows a schematic overview of a system 37 for inspecting the factory joint 2 during installation. It comprises a 3D surface scanner 38 and a processing unit 39 couplable with the 3D surface scanner 38.

Exemplarily, the 3D surface scanner 38 is a handheld device that has a wireless connection with the processing unit 39. As an alternative or in addition thereto, the 3D surface scanner may comprise a memory for storing 3D data, which could be transferred to the processing unit 39 after the scanning process. The processing unit 39 may be a device that is separate from the 3D surface scanner 38. However, it may also be an integrated part of the 3D surface scanner 38.

The processing unit 39 is configured to receive 3D surface geometry measurement data from the 3D surface scanner 38 for analyzing and processing the data. For example, the processing unit 39 is configured to inspect the 3D surface geometry measurement data to determine shape parameters and/or surface texture parameters of a layer that has been prepared. The inspected surface texture parameters can be compared with expected shape and/or surface texture parameters.

In order to inspect the factory joint 2 during installation, the 3D surface scanner 38 is used for moving about the individual layers mentioned above. Preferably, one prepared layer after another could be scanned. When the individual layers are inspected it is important that the cable ends 4 and 6 as well as an installation region between them substantially remain in the same place and with the same relative positions to each other. In the illustration of FIG. 2, the cable ends 4 and 6 are exemplarily held on two holders 40 and 42, such that the cable ends 4 and 6 remain substantially stationary for providing the installation of the factory joint 2.

Exemplarily, both cable ends 4 and 6 comprise a plurality of reference features 44 in the form of markings that are removably attached and distributed around a respective outer PVC sheath. These reference features 44 may be used to transform individual layer-wise 3D data sets captured by the 3D surface scanner 38 into a common reference coordinate system as explained below.

Figure 3:
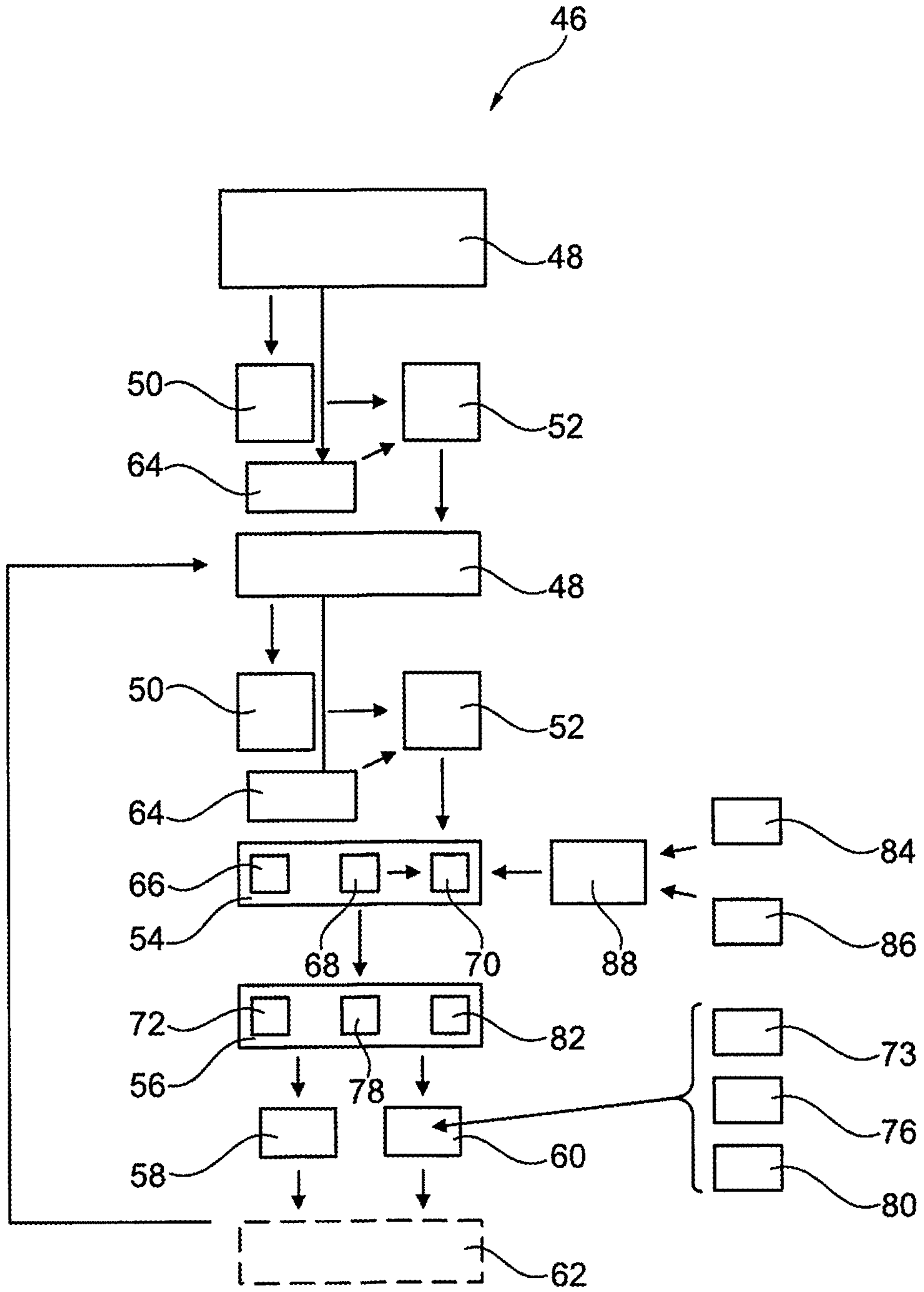
FIG. 3 shows a schematic, block-oriented view of a method for manufacturing and inspecting a factory joint during installation.

FIG. 3 shows a schematic, block-oriented illustration of a method 46 for inspecting a factory joint 2 during installation. The method comprises the step of preparing 48 an initial layer of the factory joint 2. This may, for example, comprise welding the conductors 8 and 10 of the two cable ends 4 and 6 to form the weld 12 and finishing the resulting outer surface.

Then, the steps of capturing 50 and storing 52 an initial set of 3-dimensional (3D) surface geometry measurement data of an outer surface of the initial layer by moving the 3D surface scanner 38 about the initial layer follows. This leads to the creation and storage of a data set associated with the initial layer. As mentioned above, the data may be stored in the 3D surface scanner 38 and/or in a separate processing unit 39.

Afterwards, the step of preparing 48 a subsequent layer of the factory joint 2, as well as capturing 50 and storing 52 a subsequent set of 3-dimensional (3D) surface geometry measurement data of an outer surface of the subsequent layer by moving the 3D surface scanner 38 about the subsequent layer may follow. The subsequent layer may, for example, be the inner semiconducting layer 14, the fine-coned surfaces of the cones 20 and 22 or the like.

The step of merging 54 the 3D surface geometry measurement data of the subsequent layer with previous 3D surface geometry measurement data by transforming the captured 3D surface geometry measurement data of the layers into a common reference coordinate system to form a merged 3D model of the layers follows. Resultantly, the data sets of the initial layer and the subsequent layer will be converted into a coherent data set that represents both layers. As indicated below, further data sets may be produced by repeatedly capturing subsequent layers and merging the respective data sets with the already existing data set.

The merged 3D model may be analyzed 56 to determine shape parameters and/or surface texture parameters of the subsequent layer. The determined shape parameters may be compared 58 with expected shape parameters. As an alternative or in addition thereto, the determined surface texture parameters may be compared 60 with expected surface texture parameters. If the determined shape parameters deviate by more than a predetermined shape tolerance from the expected shape parameters or if the determined surface texture parameters deviate by more than a predetermined surface texture tolerance from the expected surface texture parameters a deviation signal may be output 62. The model may be analyzed section after section, such that local deviations may be detected.

The steps 48 to 62 may be repeated until the factory joint 2 is completed.

When the initial layer and the subsequent layer(s) are captured 50 and stored 52, at least one reference feature 44 separate from the layers may be captured 64, such that the captured 3D surface geometry measurement data of the layers comprise the reference feature 44. The transforming of step 54 may then comprise matching 66 the shape and orientation of the three-dimensional reference feature 44 in the layers.

In addition, or as an alternative to using the reference feature 44, the transforming of step 54 may comprise identifying 68 geometrical divergences of a surface area of two subsequent layers and matching 70 the orientation of the surface area in the layers based on the divergences.

The step of analyzing 56 may comprise determining 72 layer thicknesses as shape parameters of the respective layer from the merged 3D model, and the comparing 60 may comprise comparing 73 the determined layer thicknesses with expected layer thicknesses.

The step of analyzing 56 may comprise determining 74 the orientation and spatial course of boundary edges as shape parameters of the respective layer from the merged 3D model, and the comparing 60 may comprise comparing 76 the determined orientation and spatial course of boundary edges with expected orientation and spatial course.

The step of analyzing 56 may comprise determining 78 a slope of the cones 20 and 22 or any other layer that is arranged on the cones 20 and 22 that has an at least partially conical shape. The comparing 60 may thus comprise comparing 80 the slope of the respective conical shape with an expected slope of the respective conical shape.

Also, the step of analyzing 56 may comprise identification 82 of textural defects by analyzing textural structures.

The method 46 may comprise capturing 84 and storing 86 a set of volumetric 3D image data of at least one layer by using a volumetric 3D imaging device, and combining 88 the volumetric 3D image data with the 3D surface geometry measurement data of the at least one layer to form an enhanced 3D model.

REFERENCE NUMERALS

2 factory joint
4 first cable end
6 second cable end
8 first conductor
10 second conductor
12 weld
14 inner semiconductor layer
16 insulation
18 insulation
20 cone
22 cone
24 joint insulation
26 axial end
28 axial end
29 outer semiconducting layer
30 lead sheath
32 PE sheath
34 metallic screen
36 outer PVC protection sheath
37 system
38 3D surface scanner
39 processing unit
40 holder
42 holder
44 reference feature
46 method
48 preparing layer
50 capturing
52 storing
54 merging
56 analyzing
58 comparing shape parameters
60 comparing surface texture parameters
62 outputting deviation signal
64 capturing reference feature
66 matching shape and orientation of reference feature
68 identifying geometrical divergences
70 matching orientation
72 determining layer thickness
73 comparing layer thickness
74 determining orientation and spatial course
76 comparing orientation and spatial course
78 determining slope
80 comparing slope
82 identification of textural defects
84 capturing volumetric image data
86 storing volumetric image data
88 combining volumetric image data and surface geometry data

The invention claimed is:

1. A method for manufacturing and inspecting a factory joint during installation, the method comprising steps of:

a) preparing an initial layer of the factory joint, b) capturing and storing an initial set of 3-dimensional (3D) surface geometry measurement data of an outer surface of the initial layer by moving a 3D surface scanner about the initial layer, c) preparing a subsequent layer of the factory joint, d) capturing and storing a subsequent set of 3-dimensional (3D) surface geometry measurement data of an outer surface of the subsequent layer by moving the 3D surface scanner about the subsequent layer, e) merging the 3D surface geometry measurement data of the subsequent layer with all previously captured 3D surface geometry measurement data by transforming the captured 3D surface geometry measurement data of the layers into a common reference coordinate system to form a merged 3D model of the layers, f) analyzing the merged 3D model to determine shape parameters and/or surface texture parameters of the subsequent layer, g) comparing the determined shape parameters with expected shape parameters, and/or comparing the determined surface texture parameters with expected surface texture parameters, and if the determined shape parameters deviate by more than a predetermined shape tolerance from the expected shape parameters and/or if the determined surface texture parameters deviate by more than a predetermined surface texture tolerance from the expected surface texture parameters outputting a deviation signal, and h) repeating steps c) to g) until the factory joint is completed.

2. The method according to claim 1, wherein at least one of the layers comprises an insulation material.

3. The method according to claim 1, wherein at least one of the layers comprises a semiconducting material.

4. The method according to claim 1, wherein at least one of the layers has a conical shape.

5. The method according to claim 1, wherein capturing of the initial layer and of the subsequent layer(s) comprises capturing at least one reference feature separate from the layers when capturing the 3D surface geometry measurement data of the layers, such that the captured 3D surface geometry measurement data of the layers comprise the reference feature, and wherein the transforming of step e) comprises matching the shape and orientation of the reference feature in the layers.

6. The method according to claim 1, wherein the transforming comprises identifying geometrical divergences of a surface area of two subsequent layers and matching the orientation of the surface area in the layers based on the divergences.

7. The method according to claim 1, wherein step f) comprises determining layer thicknesses as shape parameters of the respective layer from the merged 3D model, and wherein step g) comprises comparing the determined layer thicknesses with expected layer thicknesses.

8. The method according to claim 1, wherein step f) comprises determining the orientation and spatial course of boundary edges as shape parameters of the respective layer from the merged 3D model, and wherein step g) comprises comparing the determined orientation and spatial course of boundary edges with expected orientation and spatial course.

9. The method according to claim 1, wherein step e) comprises merging the 3D surface geometry measurement data of all layers to form a merged 3D model of the factory joint.

10. The method according to claim 4, wherein step f) comprises determining a slope of the conical shape as one of said shape parameters, and wherein step g) comprises comparing the slope of the conical shape with an expected slope of the conical shape.

11. The method according to claim 1, wherein step f) comprises identification of textural defects.

12. The method according to claim 1, comprising the steps of:

i) capturing and storing a set of volumetric 3D image data of at least one layer by using a volumetric 3D imaging device, and j) combining the volumetric 3D image data with the 3D surface geometry measurement data of the at least one layer to form an enhanced 3D model.

13. A system for inspecting a factory joint during installation, the system comprising:

a 3D surface scanner configured to capture 3D surface geometry measurement data of an outer surface of each of a plurality of layers of the factory joint, and a processing unit couplable with the 3D surface scanner, wherein the processing unit is configured to receive 3D surface geometry measurement data from the 3D surface scanner, and wherein the processing unit is configured to merge the 3D surface geometry measurement data of a subsequent layer with all previously captured 3D surface geometry measurement data by transforming the captured 3D surface geometry measurement data of the layers into a common reference coordinate system to form a merged 3D model of the layers, and to inspect the merged 3D model to determine shape parameters and/or surface texture parameters of the subsequent layer, and to compare the determined shape parameters with expected shape parameters, and/or to compare the determined surface texture parameters with expected surface texture parameters, and to output a deviation signal if the determined shape parameters deviate by more than a predetermined shape tolerance from the expected shape parameters and/or if the determined surface texture parameters deviate by more than a predetermined surface texture tolerance from the expected surface texture parameters.

* * * * *